US012326866B1

(12) United States Patent
Kapp et al.

(10) Patent No.: US 12,326,866 B1
(45) Date of Patent: Jun. 10, 2025

(54) OUT-OF-CORE BFS FOR SHORTEST PATH GRAPH QUERIES

(71) Applicant: Oracle International Corporation, Redwood Shores, CA (US)

(72) Inventors: Hugo Kapp, Zurich (CH); Laurent Phillipe Daynes, Saint-Ismier (FR); Vlad Ioan Haprian, Zurich (CH); Ioannis Alagiannis, Zurich (CH); Hassan Chafi, San Mateo, CA (US); Sungpack Hong, Palo Alto, CA (US); Andrew Witkowski, Foster City, CA (US); Angela Amor, Menlo Park, CA (US); Huagang Li, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/622,301

(22) Filed: Mar. 29, 2024

(51) Int. Cl.
| G06F 7/00 | (2006.01) |
| G06F 16/22 | (2019.01) |
| G06F 16/245 | (2019.01) |
| G06F 16/2452 | (2019.01) |
| G06F 16/2455 | (2019.01) |
| G06F 16/27 | (2019.01) |

(52) U.S. Cl.
CPC .... *G06F 16/24569* (2019.01); *G06F 16/2255* (2019.01); *G06F 16/24526* (2019.01); *G06F 16/24561* (2019.01); *G06F 16/278* (2019.01)

(58) Field of Classification Search
CPC .......... G06F 16/24569; G06F 16/2255; G06F 16/24526; G06F 16/24561; G06F 16/278

USPC ........ 707/713, 718, 722, 769, 802, 999.205, 707/999.001, E17.045
See application file for complete search history.

(56) References Cited

U.S. PATENT DOCUMENTS

| 6,226,639 | B1 * | 5/2001 | Lindsay ............ G06F 16/24561 |
| | | | 707/999.005 |
| 2006/0116989 | A1 * | 6/2006 | Bellamkonda .... G06F 16/24556 |
| 2010/0223437 | A1 * | 9/2010 | Park ........................ G06F 12/12 |
| | | | 711/159 |
| 2020/0364185 | A1 * | 11/2020 | Beier ..................... G06F 16/178 |
| 2023/0418827 | A1 * | 12/2023 | Kondiles ........... G06F 16/24542 |
| 2024/0004882 | A1 * | 1/2024 | Bove ................. G06F 16/24544 |

(Continued)

OTHER PUBLICATIONS

Richard E. Korf, "Minimizing Disk I/O In Two-Bit Breadth-First Search", Proceedings of the Twenty-Third Aaai Conference On Artifical Intelligence (2008), pp. 317-324.

(Continued)

*Primary Examiner* — Md I Uddin
(74) *Attorney, Agent, or Firm* — Hickman Becker Bingham Ledesma LLP; Stephen R. Tkacs

(57) ABSTRACT

A breadth first search (BFS) algorithm is provided that uses out-of-core external storage in a memory constrained system. Memory resources are used as long as they are available and external storage is used when necessary due to memory pressure. The BFS algorithm uses a disk-spilling hash-table (DSH) as the visited set and disk-spilling queues (DSQs) as the BFS frontier queue. To get the most out of the DSH, subsequent inserts and lookups must happen in the same DSH partition. To ensure that consecutive lookups happen in the same DSH partition, the BFS frontier queue is partitioned in a manner similar to the DSH partitions.

20 Claims, 10 Drawing Sheets

(56) References Cited

U.S. PATENT DOCUMENTS

2024/0403292 A1* 12/2024 Ding .................. G06F 11/3447

OTHER PUBLICATIONS

Richard E. Korf, "Best-First Frontier Search With Delayed Duplicate Detection", pp. 650-657.
Richard E. Korf et al., "Large-Scale Parallel Breadth-First Search", AAAI-05, pp. 1380-1385.
Kurt Mehlhorn et al., "External-Memory Breadth-First Search With Sublinear I/O", 12 pages.
Kameshwar Munagala et al., "I/O Complexity Of Graph Algorithms", pp. 1-8.
Deepak Ajwani et al., "A Computational Study Of External-Memory BFS Algorithms", SODA '06, pp. 601-610.
Daniel Kunkle et al., "A Comparative Analysis of Parallel Disk-Based Methods for Enumerating Implicit Graphs", PASCO'07, pp. 78-87.

* cited by examiner

OUT-OF-CORE BFS FOR SHORTEST PATH GRAPH QUERIES

FIELD OF THE INVENTION

The present invention relates to breadth first search algorithms using non-memory storage. More particularly, the present invention relates to algorithms for solving shortest path queries under strict memory constraints.

BACKGROUND

Graph processing is an important tool for data analytics. Relational database management systems (RDBMSs) increasingly allow users to define property graphs from relational tables and to query property graphs using graph pattern matching queries. Most products limit users to defining a property graph out of a single vertex table and a single edge table (e.g., Microsoft SQL Server, SAP Hana). These graphs are called homogeneous graphs. The most advanced systems (e.g., IBM DB2) allow definition of a graph out of multiple vertex and edge tables, which is referred to as a "heterogeneous" graph. Generally, for heterogeneous graphs, every row from every vertex or edge table represents a vertex or edge, respectively. For example, one can create a heterogeneous graph out of the existing tables in a database by mapping every dimension table to a vertex table and every fact table to an edge table. Generally, vertex tables should have a primary key column, and edge tables should associate two foreign keys corresponding to the primary keys in one or more vertex tables.

Graph analytics includes graph querying and pattern matching, which enables interactive exploration of graphs in a manner similar to interactive exploration of relational data using Structured Query Language (SQL). Pattern matching refers to finding patterns in graph data that are homomorphic to a target pattern, such as a triangle. Similar to SQL, in addition to matching a structural pattern, pattern matching may involve projections, filters, etc. Property Graph Query (PGQ) is a query language for the property graph data model.

Graph analytics further includes graph algorithms. Graph algorithms analyze the structure of graph data, possibly together with properties of its vertices and/or edges, to compute metrics or subgraphs that help in understanding the global structure of the graph.

Shortest path queries form an essential part of modern graph processing. Shortest path queries are extremely powerful tools for data querying and can be used to efficiently solve a large number of non-trivial real-world problems. The traditional algorithm used to solve shortest path queries is a classical breadth first search (BFS) algorithm or a derivative. The memory consumption for these algorithms is driven by the size of the visited set and the frontier queue. In the worst-case scenario, the space complexity of these algorithms is O(V+E), where V is the number of vertices and E is the number of edges in the graph.

The algorithms typically assume that the data structures will fit in memory. However, some implementations, such as applications in the cloud where resources are limited to save costs, the algorithms may be executed in memory-constrained systems. This puts a limit on the data size that can be processed by BFS algorithms in a memory-constrained system. This is typically the case for relational database connections.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

DETAILED DESCRIPTION

Figure 1A:
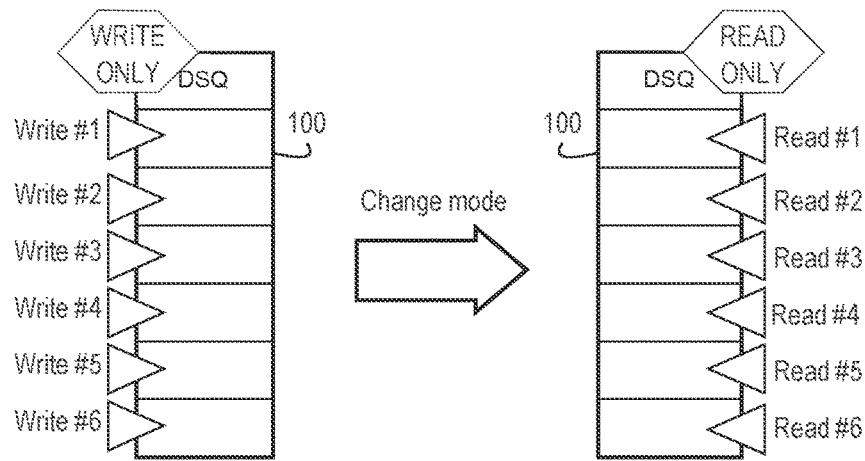
FIG. 1A illustrates a disk-spilling queue in which aspects of the illustrative embodiments may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The illustrative embodiments provide a breadth first search (BFS) algorithm that uses out-of-core external storage, such as hard drives, in a memory constrained system. The techniques of the illustrative embodiments use memory resources as long as they are available and only start using external storage when necessary due to memory pressure. In many computing environments, a low memory notification is referred to as "memory pressure." In some embodiments, volatile memory devices are considered memory, while non-volatile storage devices are considered out-of-core external storage. For example, memory may include dynamic random-access memory (DRAM), and out-of-core external storage includes hard disk drives (HDDs) and solid-state disk (SSD) devices. In one embodiment, memory may include a volatile memory, such as DRAM, and out-of-core external storage may include non-volatile random-access memory (NVRAM). In some embodiments, out-of-core external storage may include a combination of NVRAM, SSDs, and/or HDDs, e.g., in a tiered storage architecture. In some embodiments, resources are provisioned in a distributed computing environment as machines, which include a number of computing cores, an amount of memory, and an amount of network bandwidth. External storage may be provisioned as part of a machine or may be provisioned separately.

The BFS algorithm of the illustrative embodiments uses a disk-spilling hash-table (DSH) as the visited set and disk-spilling queues (DSQs) as the BFS frontier queue. The algorithm uses the DSH application programming interface (API) to improve access patterns. To get the most out of the DSH, subsequent inserts and lookups must happen in the same DSH partition. To ensure that consecutive lookups happen in the same DSH partition, the BFS frontier queue is partitioned in a manner similar to the DSH partitions.

The BFS algorithm of the illustrative embodiments allows solving shortest path queries on large datasets in a memory-constrained system. This helps to lower the cost of hardware setup, because external storage is usually quite cheap for its size compared to memory. The BFS algorithm of the illustrative embodiments use mechanisms that are simpler to implement than distributed computation, which are often used for scaling to large datasets. The illustrative embodiments involve a trade-off between cost and performance because external storage is typically much slower than main memory. Accessing external storage incurs a performance penalty; however, the illustrative embodiments void the overhead of adding machines to a distributed computation implementation in response to memory pressure.

Data Structures

The illustrative embodiments make use of data structures that automatically write to external storage when faced with main memory pressure: a disk-spilling queue (DSQ) and a disk-spilling hash-table (DSH). Note that even though these names mention "disk" specifically, these data structures can write to any type of external storage that has efficient sequential access and inefficient random access. First, the data structures and their external-storage driven APIs are described, and how they are used in the algorithm will be described below.

Disk-Spilling Queue (DSQ)

FIG. 1A illustrates a disk-spilling queue in which aspects of the illustrative embodiments may be implemented. DSQ 100 is a data structure that supports append-only inserts and sequential-only reads without interleaving. DSQ 100 has two states: write-only and read-only. It starts in write-only mode. While in write-only mode, data can be inserted in the queue, but no data can be read. Values are always inserted at the end of the queue.

A special API allows changing the state of DSQ 100 from write-only to read-only mode. While in read-only mode, data can be read from DSQ 100, but no data can be inserted. Reading data is a sequential process. The first value is read (i.e., the beginning of the queue), then the second value, and so on. It is not possible to revisit a previously read value. The only way to revert back to write-only mode from read-only mode is to reset DSQ 100, which deletes all the data it contains.

Figure 1B:
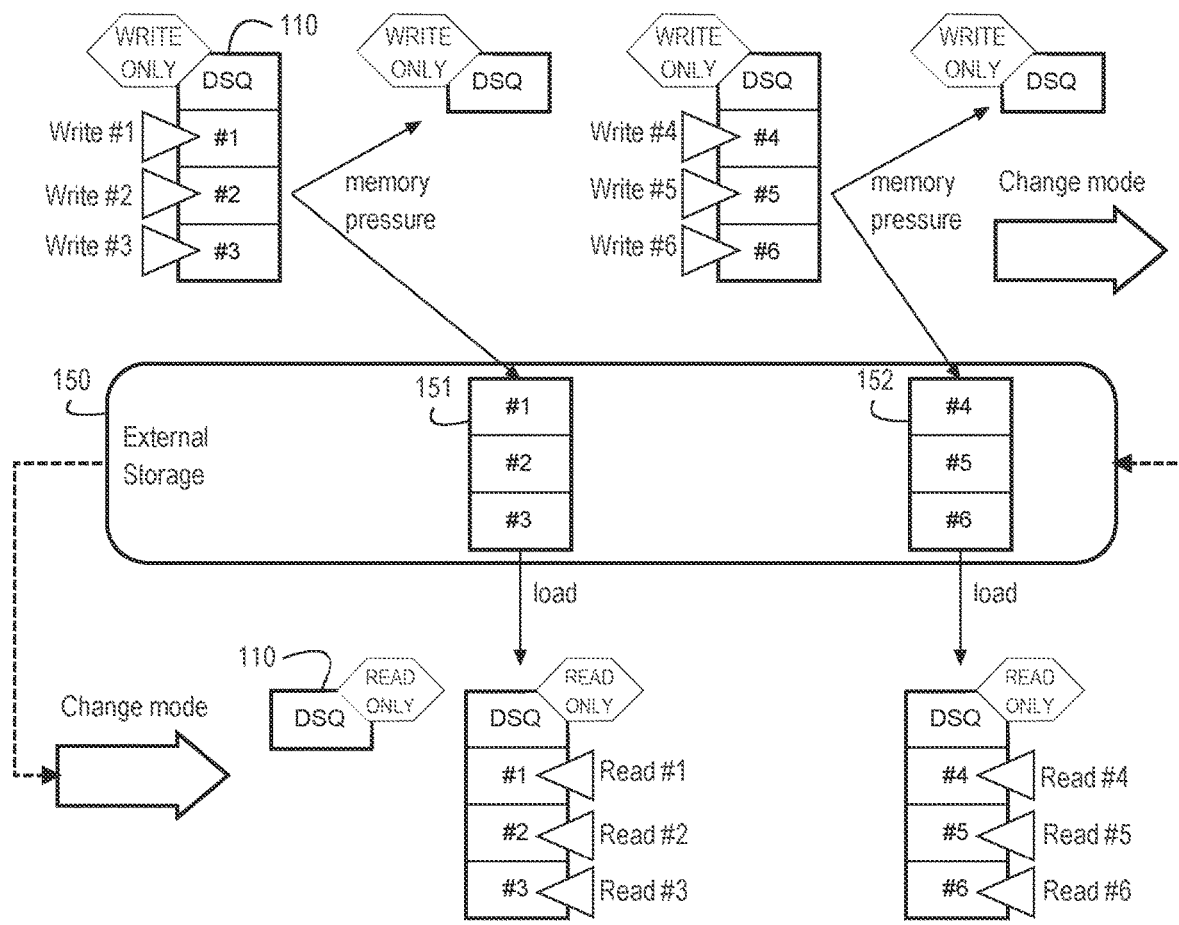
FIG. 1B illustrates a disk-spilling queue spilling to external storage when faced with memory pressure.

FIG. 1B illustrates a disk-spilling queue spilling to external storage when faced with memory pressure. When faced with memory pressure, DSQ 110 writes its entire main-memory content to external storage 150 in one large continuous chunk 151. Metadata about the location and length of this chunk is kept in memory (not shown). Then, the data just written to external storage is deleted from main memory, releasing it. Subsequent inserts are performed in main memory, until memory pressure arises again, at which time DSQ 110 writes its entire main-memory content to external storage 150 in one large continuous chunk 152.

When reading data from DSQ 110, external storage chunks 151, 152 are loaded in order into main memory. Each chunk is read in its entirety, then deleted from main memory before loading the next chunk.

Disk-Spilling Hash Table (DSH)

Figure 2A:
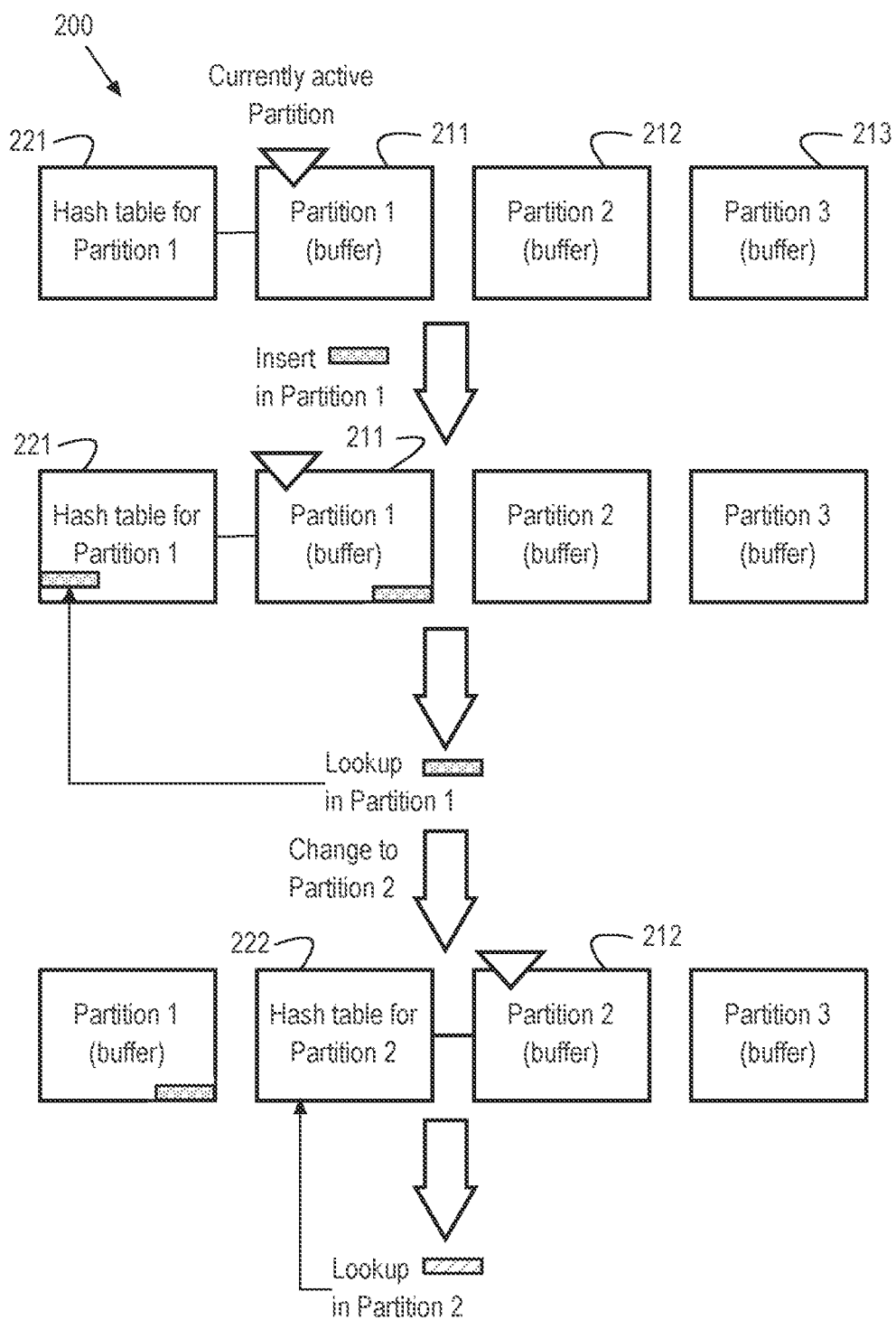
FIG. 2A illustrates a disk-spilling hash table in which aspects of the illustrative embodiments may be implemented.

FIG. 2A illustrates a disk-spilling hash table in which aspects of the illustrative embodiments may be implemented. Disk-spilling hash table (DSH) 200 is a data structure that supports efficient inserts and value-based lookups. It uses a partitioning mechanism to accommodate for the random-access nature of hash-tables. DSH 200 is a partitioned hash-table with partition 1 211, partition 2 212, and partition 3 213. The number of partitions used is determined based on the expected number of inserts and the expected available memory.

Each DSH partition 212, 212, 213 is a continuous buffer of values. When inserting a value into a partition, it is added at the end of the buffer for this partition. The buffer is grown if necessary. Only a single partition can be active at any given time. Inserts and lookups can only take place on the currently active partition. When a partition becomes active, a main-memory hash-table is built for the data it contains. For example, when partition 1 211 is active, a hash table 221 for partition 1 is built. When partition 1 211 is no longer active, the hash-table 221 is deleted, releasing the memory.

When inserting a value into the active partition, it is inserted in both the buffer for this partition (e.g., partition 1 211), and into its main memory hash-table (e.g., hash table 221 for partition 1). When looking up a value in the active partition, its main memory hash-table is probed. Thus, as shown in FIG. 2A, if partition 1 211 is the active partition, then a lookup of a value in the active partition involves probing the hash table 221 for partition 1 211. Then, a lookup of a value in partition 2 212 involves making partition 2 212 the active partition, releasing the memory for the hash table 221 for partition 1, building a hash table 222 for partition 2, and probing the hash table 222 for partition 2 212.

Figure 2B:
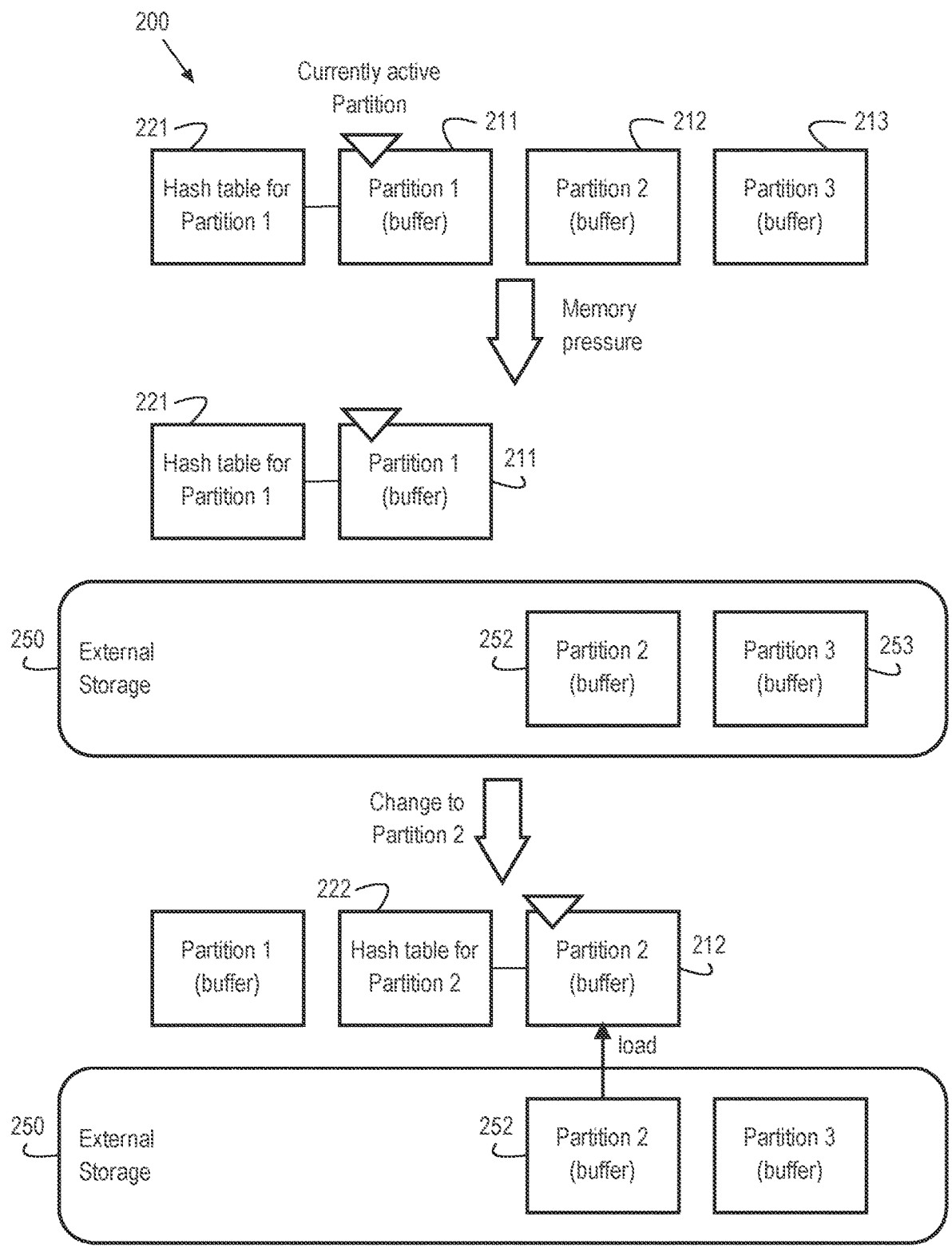
FIG. 2B illustrates a disk-spilling hash table spilling to external storage when faced with memory pressure.

FIG. 2B illustrates a disk-spilling hash table spilling to external storage when faced with memory pressure. When faced with memory pressure, partitions whose data currently reside in main memory are written to external storage 250. Metadata is kept in memory to remember the location of the data in the external storage. As shown in FIG. 2B, partition 1 211 is the active partition. In the face of memory pressure, partition 2 212 and partition 3 213 are written to external storage 250 as partition 2 252 and partition 3 253. The active partition 211 and its hash table 221 remain in memory. This process can never write the currently active partition's data to external storage 250. This limits the minimum memory usage of DSH 200 for a given workload to the maximum size among all partitions plus the size of the corresponding main memory hash-table. The number of partitions to use is computed according to this principle.

When a partition becomes active and its data does not reside in main memory, its data is loaded from external storage into main memory prior to building the hash-table for this partition. As shown in FIG. 2B, if partition 2 212 becomes the active partition, its data is loaded from external storage 250 and a hash table 222 is built for partition 2 212. Partition 1 211 may remain in memory if sufficient memory exists; otherwise, partition 1 211 can be written to external storage 250.

Each value belongs to exactly one partition. This assignment of value to partition is based on a hash function. Note that this hash function is purposefully different than the one used in individual partition hash tables. Thus, a first hash function is used to assign values to partitions, and a second hash function is used to map values to locations within a partition. This effectively makes DSH a 2-levels hierarchical hash table.

Performing an insertion or lookup into DSH 200 is efficient only when the value belongs to the currently active partition. In any other case, the currently active partition must be changed, which incurs a hash-table construction and may incur an external storage access. DSH is best used when subsequent inserts and lookups are guaranteed to fall in the same partition.

Homogeneous Algorithm

The BFS algorithm of the illustrative embodiments can solve top-k shortest path queries using the data structures described above. In this setup, any shortest queries are the special case when k=1, i.e., the query returns any single path that is the shortest path from a source vertex to a destination vertex. There may be many paths with the same number of hops; however, any shortest returns one of those paths. The algorithm is trivially modified to solve all shortest queries instead. The simple case of homogeneous graphs is described first, and then the modifications necessary to support heterogeneous graphs are described below.

The algorithm uses DSH as its visited set, and DSQ as its BFS frontier queue. The algorithm uses the DSH API to improve access patterns. To get the most out of DSH, subsequent inserts and lookups must happen in the same DSH partition. To ensure consecutive inserts and lookups happen in the same DSH partition, the BFS frontier queue is divided into partitions in a manner similar to DSH's partitioning.

Use of DSH

The illustrative embodiments use DSH to map a vertex (identified by the value of its primary key (PK) columns) to the number of times that vertex has been reached so far. Knowing the number of times a vertex has been reached is necessary for top-k shortest path queries. In the special case where k=1, reading and writing that value can be avoided. In that case, DSH behaves like a set. This reduces space consumption.

Representation of Paths

When processing shortest path queries, the original query may ask questions about values along the path (e.g., an aggregation over property values). A BFS algorithm that answers such queries must therefore keep a representation of the paths, and not just vertices.

Some BFS implementations represent paths by using subpath prefix sharing. What that means is that each expanded subpath contains information about its last hop, and some reference to its parent subpath. In this way, subpath prefixes are shared across all the subpaths that extend them, reducing memory consumption.

Figure 3A:
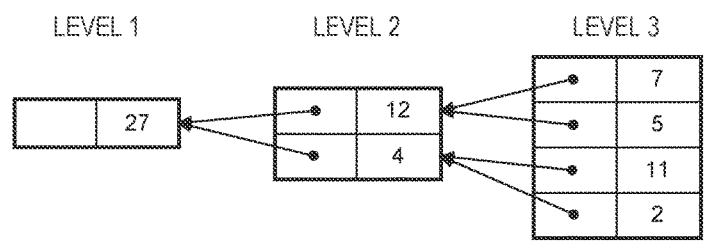
FIG. 3A illustrates path representations using prefix sharing which may be used to implement aspects of the illustrative embodiments.

FIG. 3A illustrates path representations using prefix sharing which may be used to implement aspects of the illustrative embodiments. As shown in FIG. 3A, BFS level 1 finds vertex 27 (e.g., matches vertex 27 to a start vertex of a query). BFS level 2 expands vertex 27 to vertices 12 and 4. That is, BFS level 2 finds that vertex 12 and vertex 4 are valid neighbor vertices of vertex 27. BFS level 2 stores the last hop (e.g., vertex 12) and a reference to its parent (e.g., vertex 12). BFS level 3 expands vertex 12 to vertices 7 and 5 and also expands vertex 4 to vertices 11 and 2. That is, BFS level 3 finds that vertex 7 and vertex 5 are valid neighbor vertices of vertex 12 and finds that vertex 11 and vertex 2 are valid neighbor vertices of vertex 4. BFS level 3 stores the last hop (e.g., vertex 7) and a reference to its parent (e.g., vertex 12).

With this technique, final solution paths must be reconstructed by recursively following the parent pointers until the root is reached. This path reconstruction step incurs a lot of random accesses. These may be acceptable in a fully in-memory scenario, but if some part of this data may be on disk (or some other external storage), the cost of random access would be too high. Because of the nature of graph processing, finding some smart way to cache prefixes or make the accesses sequential is difficult.

Prefix Copy

In the BFS algorithm with out-of-core external storage of the illustrative embodiments, prefix copy can be used instead of prefix sharing. In prefix copy, each subpath stores the entire path information. That is, a path is a list of hops. Each hop stores sufficient information to answer the original query. This may include vertex identifiers, edge identifiers, property values, etc.

Figure 3B:
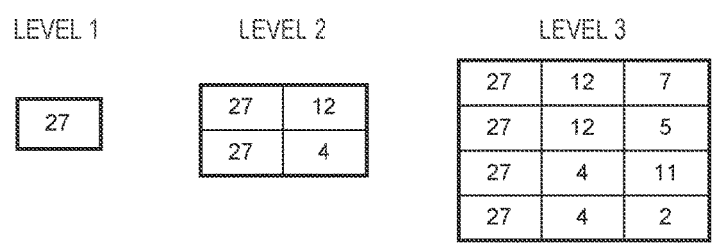
FIG. 3B illustrates path representations using prefix copy which may be used to implement aspects of the illustrative embodiments.

FIG. 3B illustrates path representations using prefix copy which may be used to implement aspects of the illustrative embodiments. As shown in FIG. 3B, BFS level 1 finds vertex 27 (e.g., matches vertex 27 to a start vertex of a query). BFS level 2 expands vertex 27 to vertices 12 and 4. That is, BFS level 2 finds that vertex 12 and vertex 4 are valid neighbor vertices of vertex 27. BFS level 2 stores the entire subpath information up to level 2 (e.g., vertex 27 to vertex 12). BFS level 3 expands vertex 12 to vertices 7 and 5 and also expands vertex 4 to vertices 11 and 2. That is, BFS level 3 finds that vertex 7 and vertex 5 are valid neighbor vertices of vertex 12 and finds that vertex 11 and vertex 2 are valid neighbor vertices of vertex 4. BFS level 3 stores the entire subpath information up to level 3 (e.g., vertex 27 to vertex 12 to vertex 7).

This choice is a space-time tradeoff. This technique uses more space because of the repetitions of shared subpaths but avoids random accesses altogether (all accesses are sequential). Considering the use of external storage in this invention, this trade-off is generally acceptable. External storage devices typically have very large sizes but extremely poor random-access performance. There are ways to reduce the copy overhead while keeping sequential access patterns, which is an extensively studied problem with many known solutions. These are not discussed here.

Use of DSQ

The illustrative embodiments use DSQ as the BFS frontier queue. To accommodate the strict "write-only then read-only" flow of DSQ, the illustrative embodiments use two DSQs: one DSQ represents the current level, and another DSQ represents the next level. The current level DSQ represents the subpaths that may be expanded in the current BFS level. The current level DSQ is read-only. The next level DSQ represents the new subpaths, each of which expands a subpath found in the current level DSQ. The next level DSQ is write-only (no reads).

Figure 4:
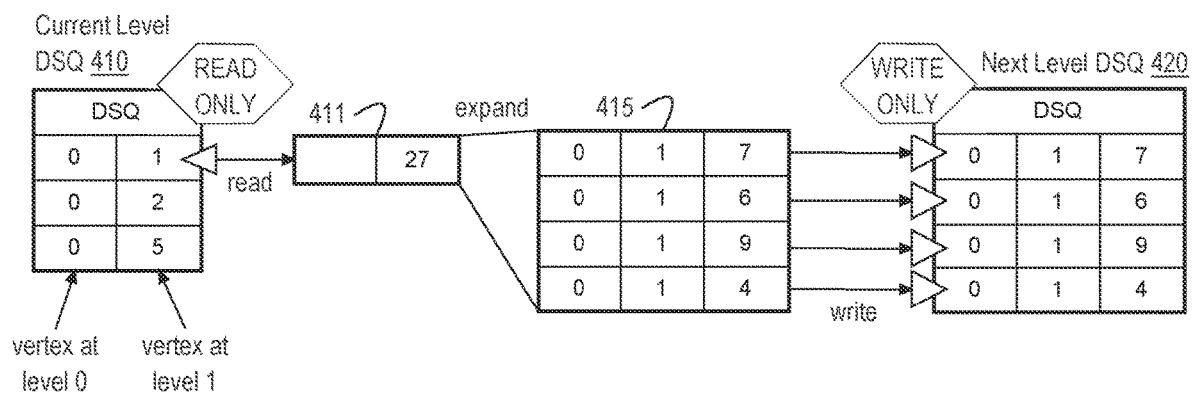
FIG. 4 illustrates using disk-spilling queues to represent the BFS frontier in accordance with an illustrative embodiment.

FIG. 4 illustrates using disk-spilling queues to represent the BFS frontier in accordance with an illustrative embodiment. During a BFS level, each subpath 411 is read from the current level DSQ 410 and then expanded. The neighbors found 415 are written into the next level DSQ 420.

Figure 5:
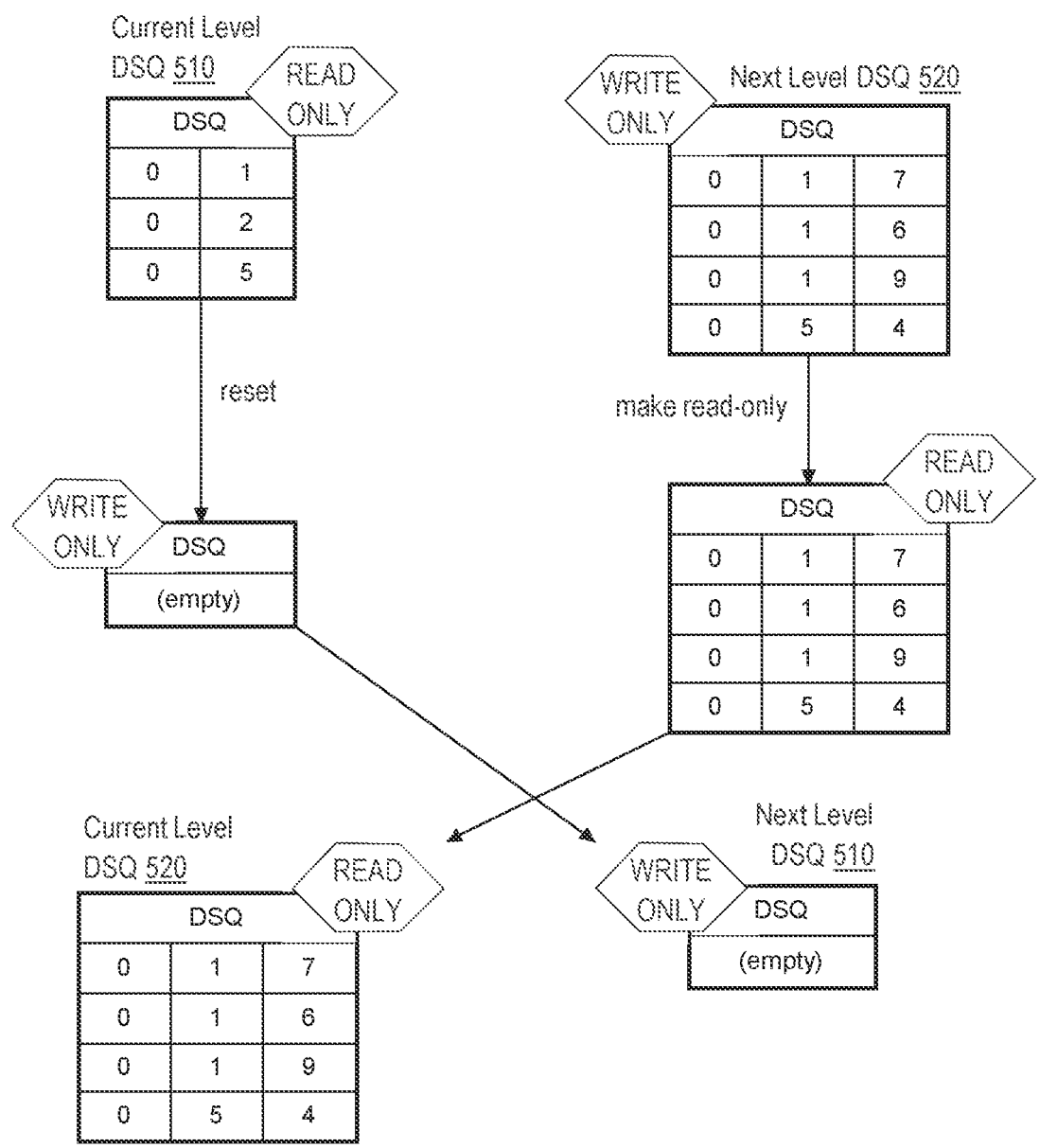
FIG. 5 illustrates swapping disk-spilling queues at the end of a BFS level in accordance with an illustrative embodiment.

FIG. 5 illustrates swapping disk-spilling queues at the end of a BFS level in accordance with an illustrative embodiment. At the end of each BFS level, the DSQs 510, 520 are swapped. The DSQ 520 that previously represented the next level becomes the new current level DSQ. Logically, at the end of a BFS level, this DSQ 520 contains the subpaths that the algorithm will iterate over in the next BFS level. The mode of DSQ 520 is changed from write-only to read-only.

The DSQ 510 that previously represented the current level can now be reused as a new empty next level DSQ. Note that at the end of a BFS level, the data stored in the previous current level can be deleted safely, because the data will not be reused. DSQ 510 is then reset to delete its data and DSQ 510 is made write-only to serve as the next level DSQ. DSQ 510, as the net level DSQ, will now store two more columns than it did previously as the current level DSQ. For example, consider DSQ 510 stores two columns for a two-vertex (one-hop) subpath as the current level DSQ and DSQ 520 stores three columns for a three-vertex (two-hop) subpath as the next level DSQ. Then, after switching, DSQ 520 as the current level DSQ will continue to store three columns, and DSQ 510 as the next level DSQ will now store four columns (to expand two-hop supaths to three-hop subpaths).

DSQ Partitioning

In a classical BFS implementation to solve top-k shortest queries, hash-table operations are performed in the following contexts:
  1. When reading a subpath from the BFS frontier queue, look up the last vertex of that subpath. This checks whether this subpath should be expanded.
  2. If the subpath is to be expanded, insert or update the corresponding entry in the hash table. Increase the number of times this vertex has been reached by 1.
  3. (Optional) For each new subpath found when expanding a subpath, look up the last vertex of that new subpath. This is a best effort attempt to reduce the size of the frontier queue by not writing data in it that will not be expanded.

How to efficiently perform operations 1 and 2 is described as follows, and then operation 3 is described below.

Partitioned BFS Frontier

In order to efficiently perform operations using DSH, subsequent inserts and lookups must fall within the same partition. The illustrative embodiments ensure this by enforcing a partition-oriented iteration over the BFS frontier. This is achieved by partitioning the BFS frontier. The illustrative embodiments mimic the partitioning of DSH in the DSQ queue. To do this, two DSQs are created per DSH partition; one for the current level and one for the next level.

Figure 6:
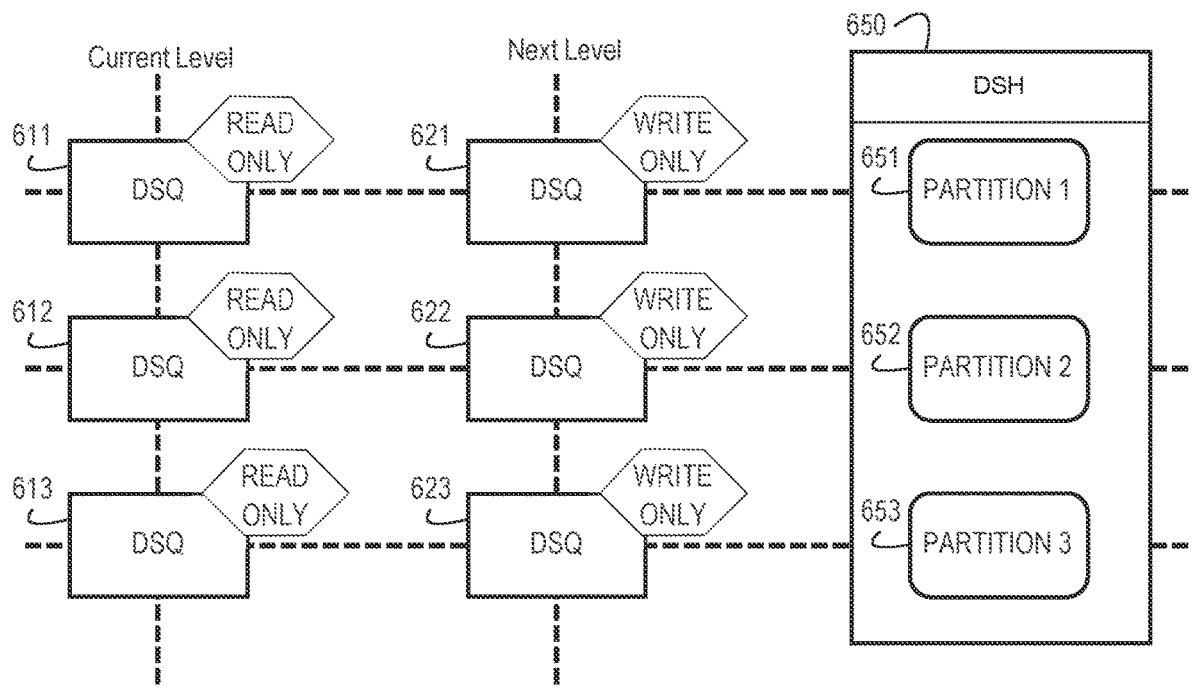
FIG. 6 illustrates a partitioned BFS frontier in accordance with an illustrative embodiment.

FIG. 6 illustrates a partitioned BFS frontier in accordance with an illustrative embodiment. As shown in FIG. 6, DSH 650 is divided into partition 1 651, partition 2 652, and partition 3 653. For partition 1 651, there is a current level DSQ 611 and a next level DSQ 621. For partition 652, there is a current level DSQ 612 and a next level DSQ 622. For partition 3 653, there is a current level DSQ 613 and a next level DSQ 623. Each row in these DSQs is guaranteed to end up in the corresponding DSH partition. In other words, the last vertex of every subpath stored in a given DSQ belongs to the same DSH partition.

Figure 7:
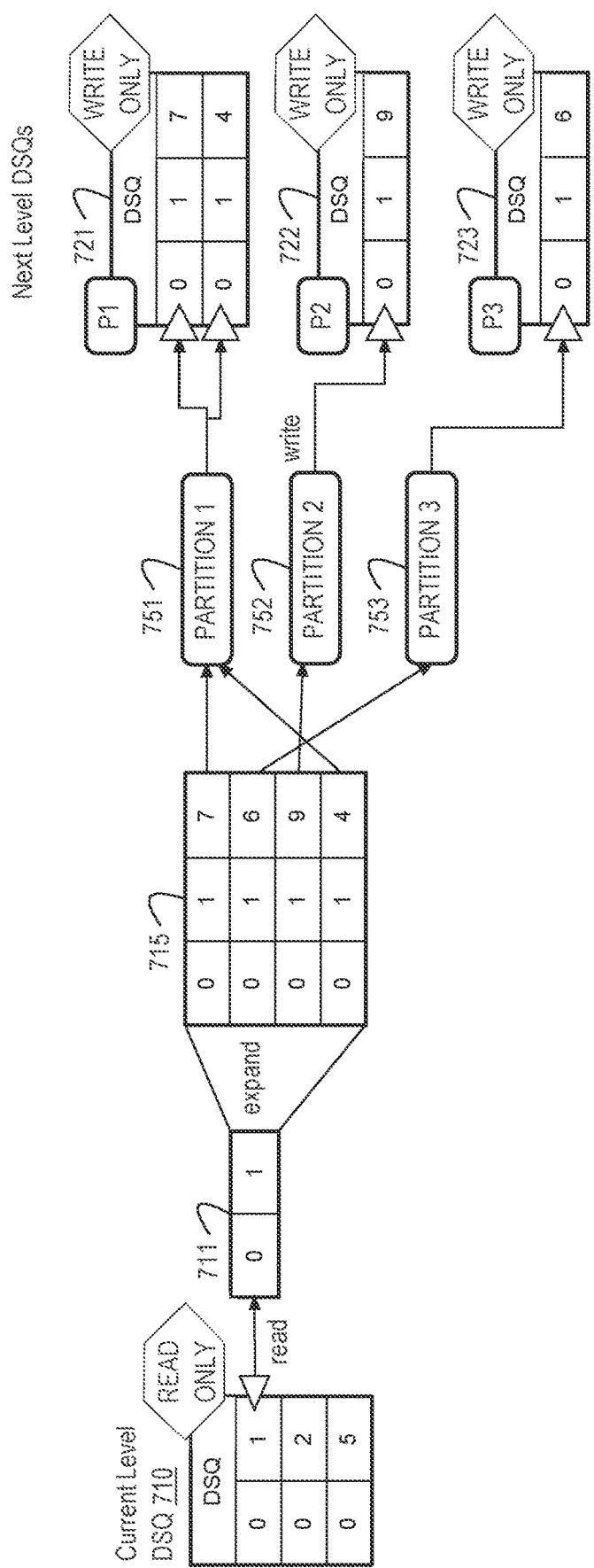
FIG. 7 illustrates appending expanded subpaths to a DSQ corresponding to a DSH partition in accordance with an illustrative embodiment.

FIG. 7 illustrates appending expanded subpaths to a DSQ corresponding to a DSH partition in accordance with an illustrative embodiment. During a BFS level, each subpath 711 is read from the current level DSQ 710 and then expanded. The neighbors found 715 are written into a next level DSQ 721, 722, 723 corresponding to an appropriate DSH partition 751, 752, 753. The illustrative embodiment guarantees consistent DSQ partitioning by appending expanded subpaths to the DSQ 721, 722, 723 corresponding to the DSH partition 751, 752, 753 to which the last vertex belongs. The BFS algorithm determines which DSH partition a given vertex belongs to by applying the exact same hash-based mechanism that DSH uses for partitioning.

When reading subpaths considered for expansion during a given BFS level, the BFS algorithm reads from each DSQ partition relating to the current BFS level. The BFS algorithm does this in order, i.e., start by reading the first partition, and when all data has been read, move to the second partition, and so on. With this mechanism, successive DSH inserts and lookups are guaranteed to fall within the same DSH partition. This is how the lookups and inserts related to the pre-expand subpaths are performed.

Neighbor Lookups

The optional neighbor lookup cannot in general be guaranteed to fall within the same partition as the subpath read from the current level DSQ 710. These neighbors 715 can theoretically be any vertex in the graph. There is no clear structure that describes the distribution of neighbors. Considering the hash-based partitioning scheme used in DSH, a sequence of arbitrary vertices is expected to be evenly split across the different DSH partitions 751, 752, 753. A best effort lookup of neighbors can be performed though. That is, if a neighbor happens to fall within the currently active partition, the neighbor lookup can be performed. For example, if current level DSQ 710 corresponds to partition 1 751, and partition 1 751 is the active partition in the DSH, then neighbor lookup can be performed for the first and fourth subpaths in neighbor expansions 715. The probability of that happening reduces with the number of partitions (assuming a perfect hashing function, it is 1/#partitions). Any neighbor that does not happen to belong to the currently active partition, such as the second and third subpaths in neighbor expansions 715, must be written in the next level DSQ 722, 723. These subpaths will be looked up in the DSH in the next BFS level, before they are expanded.

These lookups are not necessary for correctness; however, they help reduce memory or storage consumption. Considering the use of external storage in this algorithm, the extra space used is worth it, as it avoids constantly changing DSH partitions, which could potentially involve accessing external storage every time.

Heterogeneous Algorithm

To simplify the description, the homogeneous case (i.e., a graph with a single vertex table and a single edge table) has been discussed above. The additions needed to support the heterogeneous case do not change the main ideas described so far. Going from homogeneous to heterogeneous (i.e., a graph with more than one vertex table) introduces three main changes to the data model:
  1. Vertices may come from different vertex tables. The number and types of primary key columns may differ across vertex tables.
  2. Vertex tables may have more than one outgoing edge table. These edge tables may point to various vertex tables.

To address the first point, the BFS algorithm separates the data per vertex table. This is done for the DSQs and DSH.

To that end, the BFS algorithm creates and uses one DSH per vertex table and one set of DSQs per vertex table. This set of DSQs contains two DSQs per partition in the corresponding DSH. Note that the number of DSQs per vertex table is therefore not constant. Some vertex tables may have more DSH partitions than others and, hence, more DSQs. This separation per vertex table guarantees consistency of the primary key types within every data structure used.

When doing neighbor expansion, the BFS algorithm iterates over the outgoing edge tables for the current vertex table. For each edge table, the destination vertex table is known. When writing the neighbors found by following a particular edge table, the BFS algorithm first finds the set of DSQs corresponding to the destination vertex table and then inserts the row in the corresponding DSQ based on the partitioning mechanism described above.

Procedural Over View

Figure 8:
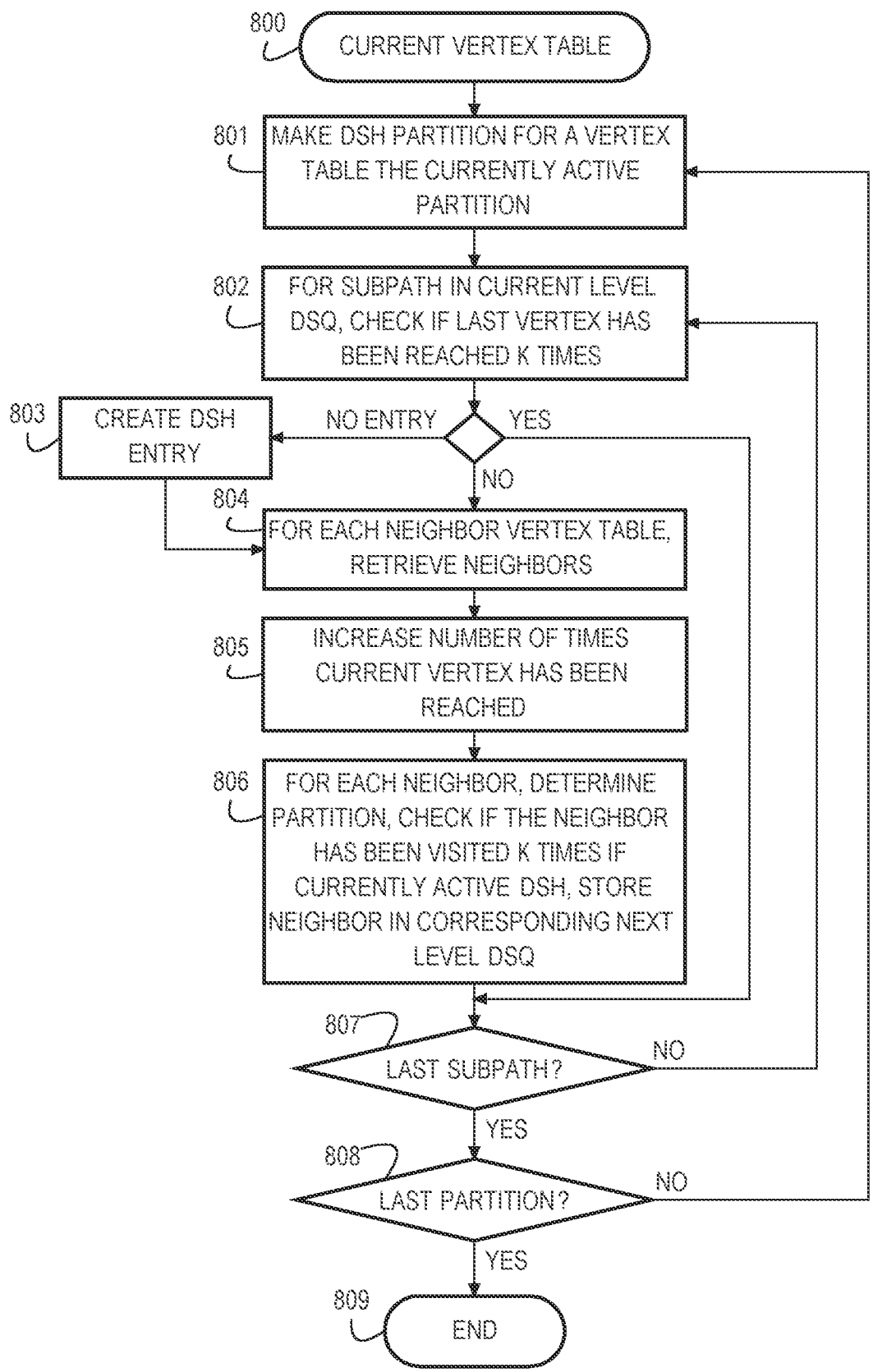
FIG. 8 is a flowchart illustrating operation of a breadth first search algorithm using out-of-core external storage in accordance with an illustrative embodiment.

FIG. 8 is a flowchart illustrating operation of a breadth first search algorithm using out-of-core external storage in accordance with an illustrative embodiment. Initialization includes storing the starting vertex in the corresponding next level DSQ and swapping the DSQs by resetting the current level DSQ, make the next level DSQ read-only, and swapping the DSQ sets (the next level DSQs become current level DSQs and the current level DSQs become next level DSQs). The starting vertex is now in the current level DSQ.

Operation of FIG. 8 is performed for each BFS level and for each vertex table. Operation begins with the current vertex table being processed by the BFS algorithm (block 800). The BFS algorithm makes the DSH partition for the vertex table the currently active partition (block 801). For a subpath in the current level DSQ, the BFS algorithm checks if the last vertex has been reached k times (block 802). This is for a top-k shortest path query. For any shortest path queries, k=1.

If checking if the last vertex has been reached k times in block 802 results in no entry being found in the DSH, then the BFS algorithm creates a DSH entry for the vertex (the last vertex in the subpath) (block 803). Thereafter, or if the last vertex has not been reached k times in block 802, the BFS algorithm retrieves neighbor vertices for each neighbor vertex table (block 804). The BFS algorithm then increases the number of times the current vertex (i.e., the last vertex of the current subpath) has been reached in the DSH (block 805). Then, for each neighbor, the BFS algorithm determines a partition using the same hash function used to partition the DSH, checks if the neighbor has been visited k times if the partition is the currently active partition in the DSH (and skips the neighbor if it has been visited k times), and stores the neighbor in the corresponding next level DSQ (if the neighbor has not been visited k times) (block 806). For all neighbors that are not in the currently active partition, the BFS algorithm does not skip the neighbor, because the BFS algorithm cannot determine whether the neighbor vertex has been visited k times without changing the active DSH partition, and thus the BFS algorithm stores the neighbor (or subpath including the neighbor) in the next level DSQ corresponding to the partition of the neighbor vertex. Then, the BFS algorithm determines whether the current subpath is the last subpath in the current level DSQ (block 807).

If checking if the last vertex has been reached k times in block 802 results in a determination that the last vertex has been reached k times, then the BFS algorithm skips the current subpath, and operation proceeds to block 807 to determine whether the current subpath is the last subpath in the current level DSQ. If the current subpath is not the last subpath (block 807: NO), then operation returns to block 802 to consider the next subpath in the current level DSQ.

If the current subpath is the last subpath in the current level DSQ (block 807: YES), then the BFS algorithm has completed processing the current level DSQ corresponding to the current DSH partition, and the BFS algorithm determines whether the current DSH partition is the last partition (block 808). If the current DSH partition is not the last partition (block 808: NO), then operation returns to block 801 to make the next DSH partition the currently active partition. If the current DSH partition is the last partition (block 808: YES), then operation ends for the current vertex table (block 806).

The operation of the flowchart in FIG. 8 can then be repeated for the next vertex table if the graph is a heterogeneous graph with more than one vertex table. When all vertex tables have been processed in the current BFS level, then the operation of the flowchart in FIG. 8 can be repeated for the first vertex table in the next BFS level. This involves swapping the DSQs by resetting the current level DSQs, making the next level DSQ read-only, making the current level DSQs write-only, and swapping the DSQ sets so that the current level DSQs become the next level DSQs and the next level DSQs become the current level DSQs.

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically marked data objects; however, the hierarchically marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables, and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance." A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e., .java file) and the compiled version of the class (i.e., .class file).

Native data types are data types supported by a DBMS "out-of-the-box." Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as valid data types and to be processed by a DBMS in database statements. In general, database software of a DBMS is programmed to recognize and process native data types without configuring the DBMS to do so by, for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
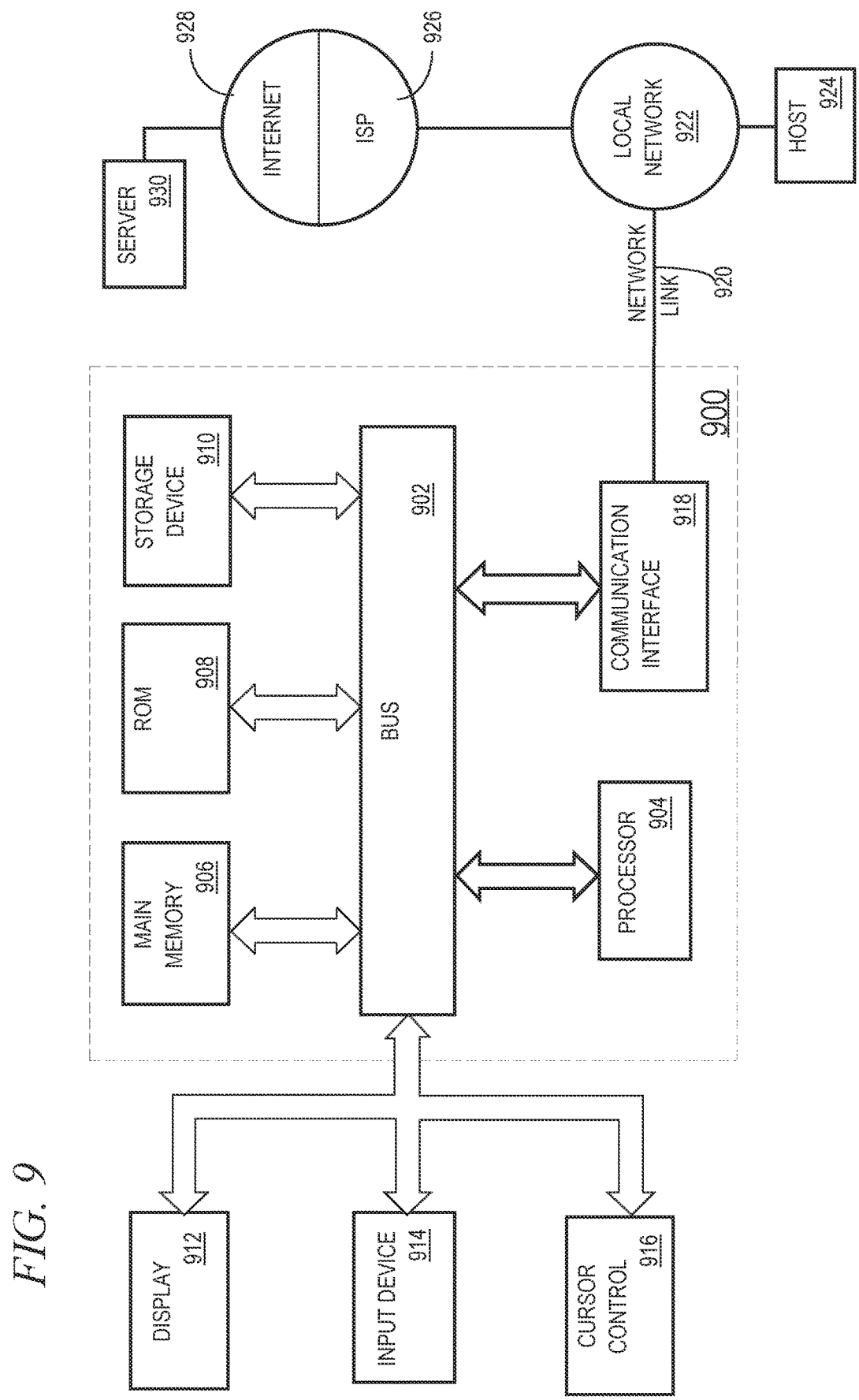
FIG. 9 is a block diagram that illustrates a computer system upon which aspects of the illustrative embodiments may be implemented.

For example, FIG. 9 is a block diagram that illustrates a computer system 900 upon which aspects of the illustrative embodiments may be implemented. Computer system 900 includes a bus 902 or other communication mechanism for communicating information, and a hardware processor 904 coupled with bus 902 for processing information. Hardware processor 904 may be, for example, a general-purpose microprocessor.

Computer system 900 also includes a main memory 906, such as a random-access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world-wide packet data communication network now commonly referred to as the "Internet" 928. Local network 922 and Internet 928 both use electrical, electromagnetic, or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Software Over View

Figure 10:
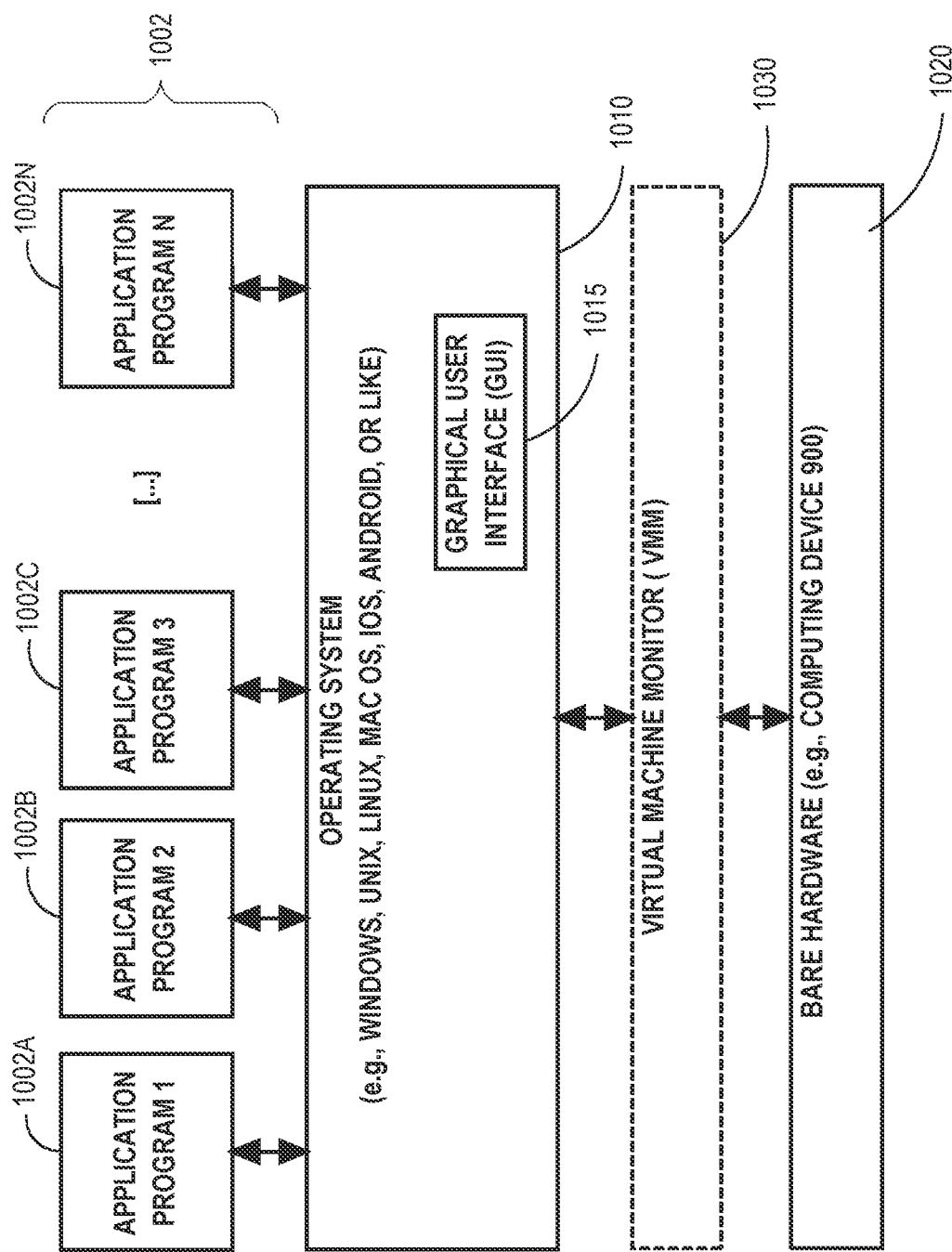
FIG. 10 is a block diagram of a basic software system that may be employed for controlling operation of a computer system upon which aspects of the illustrative embodiments may be implemented.

FIG. 10 is a block diagram of a basic software system 1000 that may be employed for controlling the operation of computer system 900. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computer system 900. Software system 1000, which may be stored in system memory (RAM) 906 and on fixed storage (e.g., hard disk or flash memory) 910, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage 910 into memory 906) for execution by system 1000. The applications or other software intended for use on computer system 900 may also be stored as a set of downloadable computer-executable instructions, for example, for downloading and installation from an Internet location (e.g., a Web server, an app store, or other online service).

Software system 1000 includes a graphical user interface (GUI) 1015, for receiving user commands and data in a graphical (e.g., "point-and-click" or "touch gesture") fashion. These inputs, in turn, may be acted upon by system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 904) of computer system 900. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the computer system 900.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of computer system 1000 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    executing a breadth first search (BFS) algorithm, wherein:
        a disk-spilling hash (DSH) table maps each visited vertex to a number of times that vertex has been reached,
        the DSH table has a plurality of DSH partitions,
        each partition of the plurality of DSH partitions is associated with a first disk-spilling queue (DSQ) representing a current BFS level and a second DSQ representing a next BFS level, wherein the first DSQ is in read-only mode and the second DSQ is in write-only mode and wherein last vertices of subpaths stored in a given DSQ belong to a same DSH partition,
        executing the BFS algorithm comprises:
            for an active DSH partition, reading a set of vertices representing a subpath from an entry in the first DSQ associated with the active DSH partition, wherein the subpath ends at a current vertex;
            updating the number of times the current vertex has been visited in the active DSH partition;
            expanding the current vertex to one or more neighbor vertices;
            for each neighbor vertex in the one or more neighbor vertices, determining a particular DSH partition associated with the neighbor vertex and storing a new subpath comprising the set of vertices and the neighbor vertex in the second DSQ associated with the particular DSH partition,
    wherein the method is performed by one or more computing devices.

2. The method of claim 1, wherein:
    the DSH table maps each visited vertex to the number of times that vertex has been reached based on a first hash function, and
    the DSH table is partitioned based on a second hash function.

3. The method of claim 2, wherein determining the particular DSH partition associated with the neighbor vertex is based on the second hash function.

4. The method of claim 1, wherein:
    a hash table for the active DSH partition and the active DSH partition are stored in memory, and
    at least one partition of the plurality of DSH partitions is stored in external storage.

5. The method of claim 4, wherein executing the BFS algorithm further comprises:
    in response to all sets of vertices being read from the active DSH partition:
        reading a next DSH partition into memory;
        building a hash table for the next DSH partition; and
        making the next DSH partition the active DSH partition.

6. The method of claim 1, wherein:
the BFS algorithm is executed as part of a top-k shortest path graph query, and
executing the BFS algorithm further comprises determining a given vertex has been visited k times based on a lookup of the given vertex in the DSH table.

7. The method of claim 6, wherein executing the BFS algorithm further comprises:
in response to the given vertex having no entry in the DSH table, inserting an entry for the given vertex in the DSH table.

8. The method of claim 6, wherein executing the BFS algorithm further comprises:
in response to the given vertex having been visited k times, skipping the given vertex.

9. The method of claim 1, wherein executing the BFS algorithm further comprises:
in response to completing the current BFS level and initiating the next BFS level, for each partition of the plurality of DSH partitions:
using the second DSQ to represent the current BFS level and the first DSQ to represent the next BFS level;
changing the second DSQ to read-only mode;
deleting data from the first DSQ; and
changing the first DSQ to write-only mode.

10. The method of claim 1, wherein:
the BFS algorithm is executed as part of a top-k shortest path graph query, and
executing the BFS algorithm further comprises:
determining whether a given neighbor vertex has been visited k times based on a lookup of the given neighbor vertex in the DSH table; and
in response to the given neighbor vertex having been visited k times, skipping the neighbor vertex.

11. The method of claim 1, wherein:
the BFS algorithm is executed as part of a graph query against a heterogeneous graph,
vertices in the heterogeneous graph are represented by a plurality of vertex tables,
the DSH table is one of a plurality of DSH tables, and
each DSH table within the plurality of DSH tables is associated with a vertex table within the plurality of vertex tables.

12. One or more non-transitory storage media storing instructions which, when executed by one or more computing devices, cause:
executing a breadth first search (BFS) algorithm, wherein:
a disk-spilling hash (DSH) table maps each visited vertex to a number of times that vertex has been reached,
the DSH table has a plurality of DSH partitions,
each partition of the plurality of DSH partitions is associated with a first disk-spilling queue (DSQ) representing a current BFS level and a second DSQ representing a next BFS level, wherein the first DSQ is in read-only mode and the second DSQ is in write-only mode and wherein last vertices of subpaths stored in a given DSQ belong to a same DSH partition,
executing the BFS algorithm comprises:
for an active DSH partition, reading a set of vertices representing a subpath from an entry in the first DSQ associated with the active DSH partition, wherein the subpath ends at a current vertex;
updating the number of times the current vertex has been visited in the active DSH partition;
expanding the current vertex to one or more neighbor vertices;
for each neighbor vertex in the one or more neighbor vertices, determining a particular DSH partition associated with the neighbor vertex and storing a new subpath comprising the set of vertices and the neighbor vertex in the second DSQ associated with the particular DSH partition.

13. The one or more non-transitory storage media of claim 12, wherein:
the DSH table maps each visited vertex to the number of times that vertex has been reached based on a first hash function, and
the DSH table is partitioned based on a second hash function.

14. The one or more non-transitory storage media of claim 13, wherein determining the particular DSH partition associated with the neighbor vertex is based on the second hash function.

15. The one or more non-transitory storage media of claim 12, wherein:
a hash table for the active DSH partition and the active DSH partition are stored in memory, and
at least one partition of the plurality of DSH partitions is stored in external storage.

16. The one or more non-transitory storage media of claim 15, wherein executing the BFS algorithm further comprises:
in response to all sets of vertices being read from the active DSH partition:
reading a next DSH partition into memory;
building a hash table for the next DSH partition; and
making the next DSH partition the active DSH partition.

17. The one or more non-transitory storage media of claim 12, wherein:
the BFS algorithm is executed as part of a top-k shortest path graph query, and
executing the BFS algorithm further comprises determining a given vertex has been visited k times based on a lookup of the given vertex in the DSH table.

18. The one or more non-transitory storage media of claim 17, wherein executing the BFS algorithm further comprises:
in response to the given vertex having no entry in the DSH table, inserting an entry for the given vertex in the DSH table.

19. The one or more non-transitory storage media of claim 12, wherein executing the BFS algorithm further comprises:
in response to completing the current BFS level and initiating the next BFS level, for each partition of the plurality of DSH partitions:
using the second DSQ to represent the current BFS level and the first DSQ to represent the next BFS level;
changing the second DSQ to read-only mode;
deleting data from the first DSQ; and
changing the first DSQ to write-only mode.

20. The one or more non-transitory storage media of claim 12, wherein:
the BFS algorithm is executed as part of a graph query against a heterogeneous graph,
vertices in the heterogeneous graph are represented by a plurality of vertex tables,
the DSH table is one of a plurality of DSH tables, and
each DSH table within the plurality of DSH tables is associated with a vertex table within the plurality of vertex tables.

* * * * *

UNITED STATES PATENT AND TRADEMARK OFFICE
CERTIFICATE OF CORRECTION

| | | |
|---|---|---|
| PATENT NO. | : 12,326,866 B1 | Page 1 of 1 |
| APPLICATION NO. | : 18/622301 | |
| DATED | : June 10, 2025 | |
| INVENTOR(S) | : Kapp et al. | |

It is certified that error appears in the above-identified patent and that said Letters Patent is hereby corrected as shown below:

On the Title Page

Column 2, under item (56) other publications, Line 3, delete "Artifical" and insert -- Artificial --, therefor.

In the Specification

In Column 9, Line 17, delete "Over View" and insert -- Overview --, therefor.

In Column 11, Line 1, delete "(MondoDB$^{TM}$" and insert -- (MongoDB$^{TM}$ --, therefor.

In Column 16, Line 4, delete "Over View" and insert -- Overview --, therefor.

Signed and Sealed this
Twelfth Day of August, 2025

Coke Morgan Stewart
*Acting Director of the United States Patent and Trademark Office*